United States Patent [19]

Löfgren et al.

[11] Patent Number: 4,819,691

[45] Date of Patent: Apr. 11, 1989

[54] VALVE DEVICE

[75] Inventors: Peter Löfgren, Hovås; Nils I. Aarthun, Partille, both of Sweden

[73] Assignee: Steridose Systems AB, Akim, Sweden

[21] Appl. No.: 161,378

[22] Filed: Feb. 22, 1988

Related U.S. Application Data

[63] Continuation of Ser. No. 921,238, Oct. 21, 1986, abandoned.

[51] Int. Cl.⁴ .............................................. F16K 7/12
[52] U.S. Cl. .................................. 137/556; 251/63.5; 251/331
[58] Field of Search ................. 251/331, 63.5; 137/556

[56] References Cited

U.S. PATENT DOCUMENTS 3,246,872  4/1966  Seltsam ............................ 251/331 X
3,426,798  2/1969  Chernak .......................... 251/331 X
3,802,462  4/1974  Trösch ............................ 137/556
4,014,514  3/1977  Priese et al. ..................... 251/331
4,316,482  2/1982  Pearce et al. .................. 137/556 X
4,319,737  3/1982  Waterfield ..................... 251/331
4,421,295  12/1983  Parkison ........................ 251/331 X Primary Examiner—Arnold Rosenthal
Attorney, Agent, or Firm—Wegner & Bretschneider

[57] ABSTRACT

A valve device for controlling a fluid flow. The device comprises a valve body arranged in a valve housing and placeable against a valve seat and moveable away from the seat. A center portion of the valve body forms an integral part of a membrane manufactured from a resilient material. Said part of the membrane freely, without friction, embraces the shaft of a membrane manoeuvring member having a head which is gripped by a cavity in the membrane.

6 Claims, 2 Drawing Sheets

VALVE DEVICE

FIELD OF THE INVENTION This application is a continuation of application Ser. No. 921,238, filed Oct. 21, 1986, and now abandoned.

The present invention relates to a valve device preferably for use as a valve having the functions "open" and "closed", respectively, in a fluid system, including also a water vapor system, where high hygiene standards prevail and retortability is a necessity. The structure as such does not exclude a valve which for instance also may be used for controlling the flow rate.

BACKGROUND OF THE INVENTION

The problem of the present invention is to provide a valve structure well suited for a fluid system and the structure of which does not disturb the sterile total concept of the system. Furtheron, the problem is to design the valve such that it allows in-line retortion or autoclaving of a flow system in which the valve is used for the time being.

Previously, valves have implied problems as to the retortion or autoclaving procedure. It has not been possible to guarantee an acceptable result when attempting to proceed by in-line autoclaving.

The assembling, autoclaving and a sterile re-assembling of the valve parts and the mounting of the valve in a fluid system under sterile conditions is a very time demanding and expensive, frequently necessary, operation which the known systems necessitate.

Known valve devices for a sterile environment frequently meet high standards of exterior design and shape of the valve. However, the known valves are not workedthrough interiorly with due consideration of a sterile concept. Such valves are acceptable when processing very long series of one and the same sterile fluid or when the valve is to be placed in a continuously operating sterile system.

However, if the conditions of operation are such that it is necessary to change fluid at short time intervals, for instance from a sterile liquid or paste to another one, the interior environment implies problems with the known valves as soon as a fluid is changed, also if the fluids happen to be sterile fluids.

OBJECTS OF THE INVENTION AND SUMMARY THEREOF

The objects of the present invention is to eliminate the problems of the known devices. Therefore the invention, in the broadest sense thereof, provides a valve device comprising a valve body arranged for abutment against and displacement from, respectively, a valve seat in a valve housing. The valve device is characterized in that at least a portion of the valve body is an integral part of a membrane arranged for permanently sealing the valve body against the valve housing at a first portion thereof and for sealing the valve body fluid flow adjustably at a second portion thereof, said membrane being manufactured from a resilient material and having such natural or unstressed shape that a fluid flow opening is obtained between the valve seat and the valve body, and in that at the side facing away from the fluid the membrane has a portion for substantially friction free embracement of a member to manoeuvring the membrane.

For symmetry reasons and the uniform force distribution of the membrane due to such symmetry, said portion embracing the manoeuvring member preferably is formed in the central region of a membrane manufactured from a resilient material, for instance latex.

Optimum abutment against the valve seat preferably is accomplished by arranging said embracing portion with a valve body for sealing against the valve seat.

A simple mechanical structure is obtained by arranging the manoeuvring member for displacing said embracing portion axially towards and away, respectively, from the valve seat.

In order to guarantee a sterile enviroment also during difficult conditions, the membrane and/or the valve housing preferably are arranged for providing an outer as well as an inner sealing circumferentially around the outer sealing.

In a preferred embodiment the manoeuvring member comprises a pin having an enlarged head arranged for being firmly gripped by the wall of a well in the portion of the membrane embracing the manoeuvring member.

In order to exteriorly signal the position of the valve, the valve device preferably comprises a member operatively connected to the pin and provided with means indicting the position of the pin and thus the position of the valve body.

In one embodiment the pin is manoeuvreable by means of a manually operated screw device.

In another embodiment the pin is manoeuvreable by a pneumatic or hydraulic device.

BRIEF DESCRIPTION OF THE DRAWINGS FIG. 1 shows a screw operated valve device according to the invention, and FIG. 2 shows a pneumatically operated valve device according to the invention.

DESCRIPTION OF PREFERRED EMBODIMENTS

Figure 1:
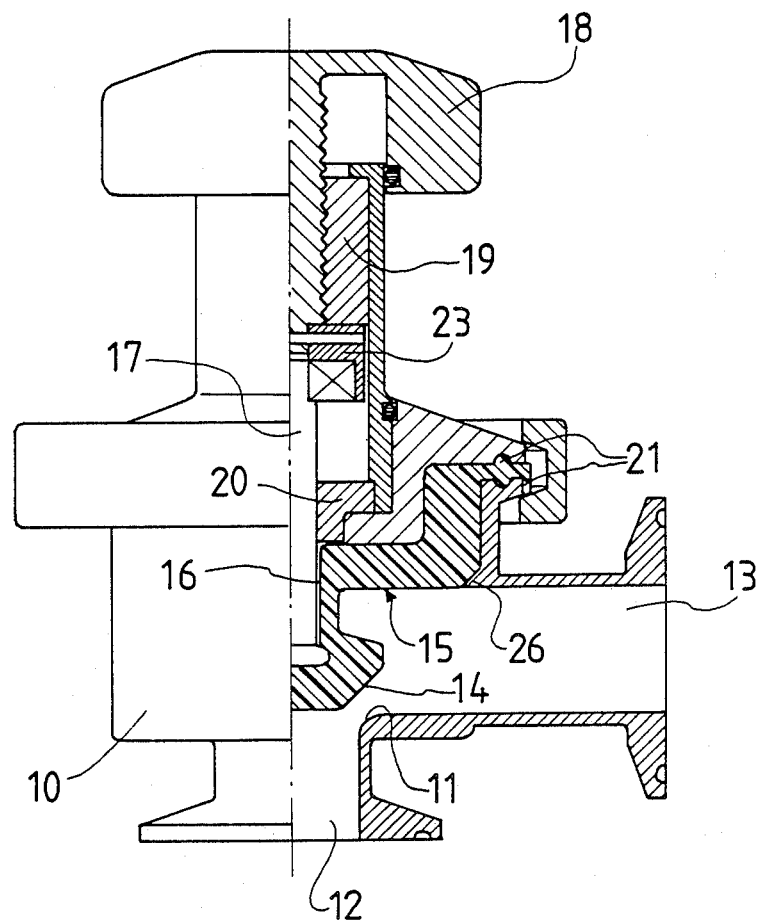

In a valve housing 10 there is arranged a valve seat 11. The valve seat cooperates with a valve body for allowing and blocking, respectively, a fluid flow or modifying such flow between connection pieces 12 and 13 arranged for being connected to a fluid system (not shown). The fluid system may be a liquid system, for instance a sterile water system.

The sealing portion of the valve body basically comprises a truncated concical body 14 formed as an integral portion of a membrane 15, for instance of latex. Seen from the fluid side, the membrane 15 basically forms a fully covering and autoclavable surface. As will be explained later on, the membrane seals most efficiently against the valve housing.

By means of the integral valve body 14 of the membrane of resilient material there is obtained efficient sealing against the valve seat when the valve body 14 by means of a manoeuvring pin is reset axially downwards in FIG. 1 to abutment against the valve seat 11.

In the embodiment that has been shown the membrane 15 has a generally circular outer configuration. The membrane is for instance injection moulded or moulded from a suitable resilient material such that it is given a profile or shape as in FIG. 1 (the hatched half) when in a normal—as moulded—condition, i.e a natural unstressed or loadfree condition. Centrally in the membrane there is a cylindrical well 16 which downwards is terminated by an enlargement. The resiliency of the membrane material allows an axial resetting/expansion in a direction towards and to abutment against the valve seat 11 as well as a radial expansion of the valve.

For such operation the well 16 freely, i.e. substantially without friction along the straight portion thereof, embraces a manoeuvring member, in the shape of a pin 17, the lower end of which is gripped by the enlarged portion of the well 16.

The pin 17, and therefor the membrane 15 with the valve body 14 thereof, are axially displaceable by rotating a knob 18. This knob is connected to the pin over a screw nut arrangement 19 which depresses and pulls up, respectively, the pin and therefor the body 14 axially under guidance of bushings 20 and 23 when the handle 18 is rotated.

The membrane 15 is sealed circumferentially against the valve housing 10 by a conventional so called food seal 21 comprising an outer flange and a double rim. Inside this outer seal there is an inner seal obtained by a rim 26 on the housing which is pressed against the membrane. The double seal arrangement and the integral membrane surface free of pockets and "blind" passages and other geometrically complex design elements that might trap contaminants, thus providing an excellent in-line sterilization environment.

Figure 2:
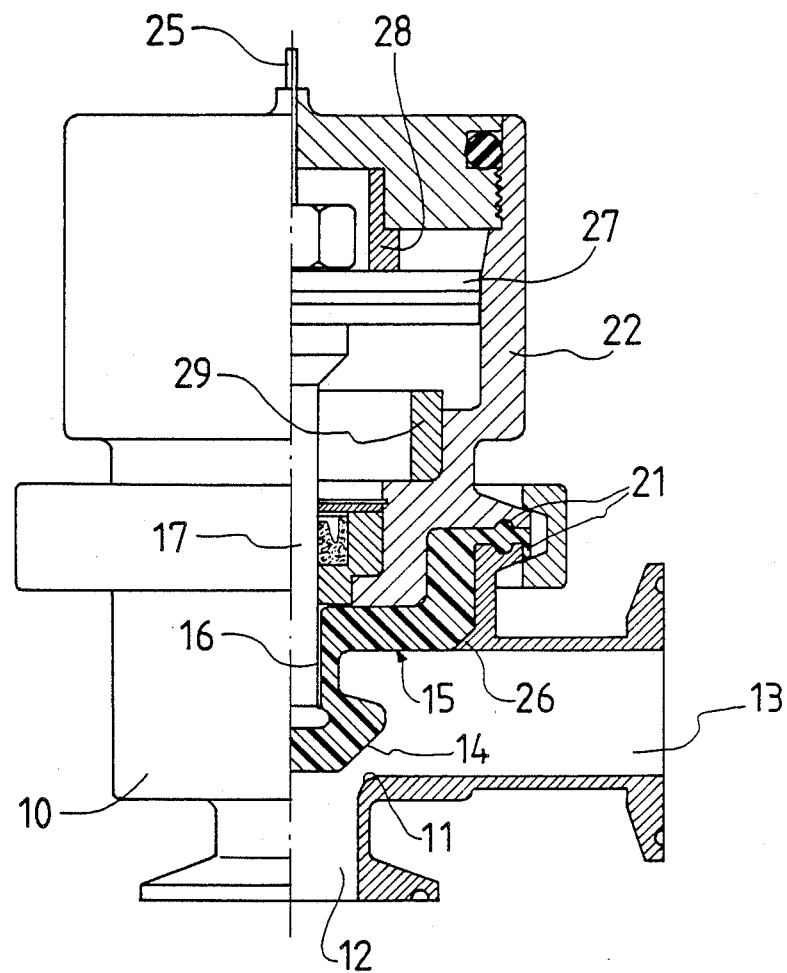

The arrangement in FIG. 2 basically corresponds to the one in FIG. 1 with the difference that instead of having a screw operated valve body, there is arranged a pneumatic device for positioning the membrane 14 and the pin 17.

A plunge 27 is arranged in a cylinder 22 and operated by supply of pressurized fluid, for instance air, between two end positions defined by end stops 28 and 29.

A device visually inspectable from the outside comprises a signal pin 25 which is operatively connected to a plunge/cylinder device and indicates the actual position of the valve body.

In the embodiment in FIG. 1, the knob 18 indicates the position of the valve by marks on the housing.

We claim:

1. A valve device for controlling flow of a fluid, comprising:
    a valve housing, said valve housing having an inwardly extending circumferential rim;
    a valve body located within said housing for abutment against and displacement from a valve seat, said valve body including an integrally formed membrane of a resilient material;
    a first portion of said membrane forming inner and outer concentric permanent seals spaced a predetermined distance apart and formed in cooperation with said valve housing, said first portion being substantially L-shaped with a vertical leg and a horizontally extending outer flange, said inner seal formed between said rim of said housing and said vertical leg and said outer seal formed between said housing and one end of said horizontally extending outer flange;
    a second portion of said membrane acting as an adjustable flow-controlling seal which cooperates with said valve seat, said first and second portions and said housing being substantially smooth so as to not trap contaminants;
    a third portion of said membrane defining a well in the side of said membrane that faces away from the fluid;
    a manoeuvering pin which has an enlarged head gripped by the bottom of the well of said third portion, the remainder of the well generating no friction with the manoeuvering pin;
    wherein, when no membrane deforming forces are acting on said membrane, said membrane forms a flow opening between said valve seat and said valve body.

2. A valve device as in claim 1, wherein said rim has a substantially triangular cross-section.

3. A valve device as in claim 1, wherein said horizontally extending outer flange has a double rim.

4. A valve device as in claim 1, wherein the valve device comprises a member operatively connected to the pin and having means for indicating the position of the pin and therefore the valve body.

5. A valve device as in claim 4, wherein the pin is manoeuvrable by means of a manually operated screw device.

6. A valve device as in claim 4, wherein the pin is manoeuvrable by means of a pneumatic or hydraulic device.

* * * * *

REEXAMINATION CERTIFICATE (3333rd)

United States Patent [19]
Löfgren et al.

[11] B1 4,819,691
[45] Certificate Issued Sep. 23, 1997

[54] VALVE DEVICE

[75] Inventors: Peter Löfgren, Hovås; Nils I. Aarthun, Partille, both of Sweden

[73] Assignee: Steridose Systems AB, Askim, Sweden

Reexamination Request:
No. 90/003,060, May 14, 1993

Reexamination Certificate for:
Patent No.: 4,819,691
Issued: Apr. 11, 1989
Appl. No.: 161,378
Filed: Feb. 22, 1988

Related U.S. Application Data

[63] Continuation of Ser. No. 921,238, Oct. 21, 1986, abandoned.
[51] Int. Cl.$^6$ .................................................. F16K 7/12
[52] U.S. Cl. ........................... 137/556; 251/63.5; 251/331
[58] Field of Search ............................ 251/63.5, 331; 137/556

[56] References Cited

U.S. PATENT DOCUMENTS

| | | |
|---|---|---|
| 650,179 | 5/1900 | Knox . |
| 2,645,238 | 7/1953 | Thornbery . |
| 3,038,488 | 6/1962 | Welch et al. . |
| 3,134,570 | 5/1964 | Jarrett et al. . |
| 3,743,245 | 7/1973 | Demler, Sr. ................... 251/331 X |
| 3,904,174 | 9/1975 | Glese . |
| 4,166,606 | 9/1979 | Kawolics et al. . |
| 4,251,053 | 2/1981 | Wurger ........................... 251/331 |
| 4,339,111 | 7/1982 | Welch ............................. 251/331 |
| 4,359,204 | 11/1982 | Williams . |
| 4,552,336 | 11/1985 | Pastrone . |
| 4,703,775 | 11/1987 | Pastrone . |

FOREIGN PATENT DOCUMENTS

| | | |
|---|---|---|
| 692514 | 6/1964 | Canada . |
| 0072681 | 8/1982 | European Pat. Off. . |
| 318753 | 4/1966 | Sweden . |

*Primary Examiner*—Denise L. Ferensic

[57] ABSTRACT

A valve device for controlling a fluid flow. The device comprises a valve body arranged in a valve housing and placeable against a valve seat and moveable away from the seat. A center portion of the valve body forms an integral part of a membrance manufactured from a resilient material. Said part of the membrane freely, without friction, embraces the shaft of a membrane manoeuvring member having a head which is gripped by a cavity in the membrane.

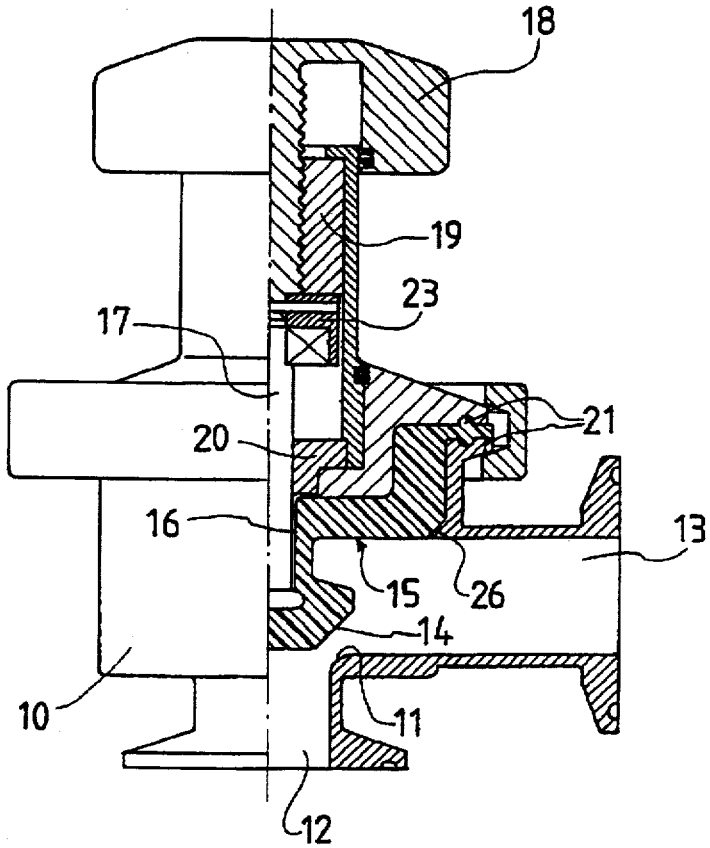

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–6, dependent on an amended claim, are determined to be patentable.

New claims 7–12 are added and determined to be patentable.

1. A valve device for controlling flow of a fluid, comprising:

a valve housing, said valve housing having an inwardly extending circumferential rim;

a valve body located within said housing for abutment against and displacement from a valve seat, said valve body including an integrally formed membrane of a resilient material;

a first portion of said membrane forming inner and outer concentric permanent seals spaced a predetermined distance apart and formed in cooperation with said valve housing, said first portion being substantially L-shaped with a vertical leg and a horizontally extending outer flange, said inner seal formed between said rim of said housing and said vertical leg and said outer seal formed between said housing and one end of said horizontally extending outer flange;

a second portion of said membrane acting as an adjustable flow-controlling seal which cooperates with said valve seat, said first and second portions and said housing being substantially smooth so as to not trap contaminants;

a third portion of said membrane defining a well *having a bottom* in [the] *that* side of said membrane that faces away from the fluid;

a maneuvering pin which has an enlarged head gripped by the bottom of the well of said third portion, the remainder of the well generating no friction with the maneuvering pin;

wherein, when no membrane deforming forces are acting on said membrane, said membrane forms a flow opening between said valve seat and said valve body.

*7. A valve device for controlling flow of a fluid or a vapor comprising:*

*a valve housing including a valve seat, said valve housing having an inwardly extending circumferential rim;*

*a valve body located within said housing for abutment against and displacement from said valve seat, said valve body including an integrally formed membrane of a resilient material, wherein the fluid flowing through the valve contacts only the membrane and the valve housing;*

*a first portion of said membrane forming inner and outer concentric permanent seals spaced a predetermined distance apart and formed in cooperation with said valve housing, said first portion being substantially L-shaped with a vertical leg and a horizontally extending outer flange, said inner seal formed between said rim of said housing and said vertical leg and said outer seal formed between said housing and one end of said horizontally extending outer flange;*

*a second portion of said membrane acting as an adjustable flow-controlling seal which cooperates with said valve seat, said first and second portions and said housing being substantially smooth so as to not trap contaminants;*

*a third portion of said membrane defining a well having a bottom in that side of said membrane that faces away from the fluid;*

*a manoeuvering pin which has an enlarged head gripped by the bottom of the well of said third portion, the remainder of the well generating no friction with the manoeuvering pin;*

*wherein, when no membrane deforming forces are acting on said membrane, said membrane forms a flow opening between said valve seat and said valve body.*

*8. A valve device for controlling flow of a fluid or of a vapor comprising:*

*a valve housing including a valve seat, said valve housing having an inwardly extending circumferential rim integrally formed on a wall of the housing which wall is not located within the flow path of said fluid, said rim being of one-piece construction with the housing;*

*a valve body located within said housing for abutment against and displacement from said valve seat, said valve body including an integrally formed membrane of a resilient material;*

*a first portion of said membrane forming inner and outer concentric permanent seals spaced a predetermined distance apart and formed in cooperation with said valve housing, said first portion being substantially L-shaped with a vertical leg and a horizontally extending outer flange, said inner seal formed between said rim of said housing and said vertical leg and said outer seal formed between said housing and one end of said horizontally extending outer flange;*

*a second portion of said membrane acting as an adjustable flow-controlling seal which cooperates with said valve seat, said first and second portions and said housing being substantially smooth so as to not trap contaminants;*

*a third portion of said membrane defining a well having a bottom in that side of said membrane that faces away from the fluid;*

*a maneuvering pin which has an enlarged head gripped by the bottom of the well of said third portion, the remainder of the well generating no friction with the manoeuvering pin;*

*wherein, when no membrane deforming forces are acting on said membrane, said membrane forms a flow opening between said valve seat and said valve body.*

*9. A valve device for controlling flow of a fluid or of a vapor comprising:*

*a valve housing including a valve seat, said valve housing having an inwardly extending circumferential rim;*

*a valve body located within said housing for abutment against and displacement from said valve seat, said valve body including an integrally formed membrane of a resilient material;* a first portion of said membrane forming inner and outer concentric permanent seals spaced a predetermined distance apart and formed in cooperation with said valve housing, said first portion being substantially L-shaped with a vertical leg and a horizontally extending outer flange, said inner seal formed between said rim of said housing and said vertical leg and said outer seal formed between said housing and one end of said horizontally extending outer flange;

a second portion of said membrane acting as an adjustable flow-controlling seal which cooperates with said valve seat for allowing and blocking the flow of a fluid, and for modifying the fluid flow by adjusting and opening between the second portion of said membrane and the valve seat so as to control the flow rate, said first and second portions and said housing being substantially smooth so as to not trap contaminants;

a third portion of said membrane defining a well having a bottom in that side of said membrane that faces away from the fluid;

a manoeuvering pin which has an enlarged head gripped by the bottom of the well of said third portion, the remainder of the well generating no friction with the manoeuvering pin;

wherein, when no membrane deforming forces are acting on said membrane, said membrane forms a flow opening between said valve seat and said valve body.

10. A valve device for controlling flow of a fluid or of a vapor comprising:

a valve housing including a valve seat, said valve housing having an inwardly extending circumferential rim;

a valve body located within said housing for abutment against and displacement from said valve seat, said valve body including an integrally formed membrane of a resilient material;

a first portion of said membrane forming inner and outer concentric permanent seals spaced a predetermined distance apart and formed in cooperation with said valve housing, said first portion being substantially L-shaped with a vertical leg and a horizontally extending outer flange, said inner seal formed between said rim of said housing and said vertical leg and said outer seal formed between said housing and one end of said horizontally extending outer flange;

a second portion of said membrane acting as an adjustable flow-controlling seal which cooperates with said valve seat, said first and second portions and said housing being substantially smooth so as to not trap contaminants;

a third portion of said membrane defining a well having a bottom in that side of said membrane that faces away from the fluid;

a manoeuvering pin which has an enlarged head gripped by the bottom of the well of said third portion, the remainder of the well generating no friction with the manoeuvering pin;

wherein, when no membrane deforming forces are acting on said membrane, said membrane forms a flow opening between said valve seat and said valve body regardless of whether the valve is fully open or fully closed;

a manoeuvering pin which has an enlarged head gripped by the bottom of the well of said third portion, the remainder of the well generating no friction with the manoeuvering pin;

wherein, when no membrane deforming forces are acting on said membrane, said membrane forms a flow opening between said valve seat and said valve body.

11. A valve device for controlling flow of a fluid or of a vapor comprising:

a valve housing including a valve seat, said valve housing having an inwardly extending circumferential rim;

a valve body located within said housing for abutment against and displacement from said valve seat, said valve body including an integrally formed membrane of a resilient material;

a first portion of said membrane forming inner and outer concentric permanent seals spaced a predetermined distance apart and formed in cooperation with said valve housing, said first portion being substantially L-shaped with a vertical leg and a horizontally extending outer flange, said inner seal formed between said rim of said housing and said vertical leg and said outer seal formed between said housing and one end of said horizontally extending outer flange;

a second portion of said membrane acting as an adjustable flow-controlling seal which cooperates with said valve seat, said first and second portions and said housing being substantially smooth so as to not trap contaminants;

a third portion of said membrane defining a well having a bottom in that side of said membrane that faces away from the fluid;

a manoeuvering pin which has an enlarged head gripped by the bottom of the well of said third portion so as to enable the pin to move the membrane in accordance with axial displacement of the pin such that the bottom of the well follows the movement of the pin, the remainder of the well generating no friction with the manoeuvering pin;

wherein, when no membrane deforming forces are acting on said membrane, said membrane forms a flow opening between said valve seat and said valve body.

12. A valve device as in claim 1, wherein said inwardly extending circumferential rim is of one-piece construction with said valve housing.

* * * * *